(12) United States Patent
Sodeta

(10) Patent No.: US 12,481,623 B2
(45) Date of Patent: Nov. 25, 2025

(54) RECORDING MEDIUM, ASSET MANAGEMENT DEVICE, LEARNING DEVICE, ASSET MANAGEMENT SYSTEM, AND ASSET MANAGEMENT METHOD

(71) Applicant: Mitsubishi Electric Corporation, Tokyo (JP)

(72) Inventor: Tetsuhiro Sodeta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/721,906

(22) PCT Filed: Apr. 15, 2022

(86) PCT No.: PCT/JP2022/017950
§ 371 (c)(1),
(2) Date: Jun. 20, 2024

(87) PCT Pub. No.: WO2023/199523
PCT Pub. Date: Oct. 19, 2023

(65) Prior Publication Data
US 2024/0419635 A1 Dec. 19, 2024

(51) Int. Cl.
*G06F 16/17* (2019.01)
*G06F 16/34* (2019.01)

(52) U.S. Cl.
CPC ........ *G06F 16/1734* (2019.01); *G06F 16/345* (2019.01)

(58) Field of Classification Search
None
See application file for complete search history.

(56) References Cited

U.S. PATENT DOCUMENTS

| | | | | |
|---|---|---|---|---|
| 2006/0184498 A1* | 8/2006 | Meyer | ............... | G06F 16/2474 |
| 2010/0332008 A1* | 12/2010 | Knipfer | ............... | G09B 25/02 |
| | | | | 700/103 |
| 2015/0347972 A1* | 12/2015 | Yamaoka | ............... | G06Q 10/06 |
| | | | | 705/300 |

(Continued)

FOREIGN PATENT DOCUMENTS

| | | |
|---|---|---|
| JP | H06-348768 A | 12/1994 |
| JP | H11-249974 A | 9/1999 |

(Continued)

OTHER PUBLICATIONS

International Search Report and Written Opinion mailed on Jul. 19, 2022, received for PCT Application PCT/JP2022/017950, filed on Apr. 15, 2022, 9 pages including English Translation.

(Continued)

*Primary Examiner* — Augustine K. Obisesan
(74) *Attorney, Agent, or Firm* — XSENSUS LLP

(57) ABSTRACT

An asset management program causes a computer to function as an acquirer that acquires operation history information indicating a history of operations on a file asset in an engineering tool from an operation log file generated in the engineering tool, and an extractor that extracts summary information indicating a summary of content of a change made to the file asset from the operation history information. The asset management program controls the computer such that the extractor causes the summary information to be stored into a database.

12 Claims, 12 Drawing Sheets

(56) References Cited

U.S. PATENT DOCUMENTS

| | | | | |
|---|---|---|---|---|
| 2016/0378811 | A1* | 12/2016 | Kapoor | G06F 16/957 707/741 |
| 2020/0104723 | A1* | 4/2020 | Reissner | G06F 8/38 |
| 2021/0382697 | A1 | 12/2021 | Singh et al. | |
| 2022/0283560 | A1* | 9/2022 | Teo | G06F 16/9577 |
| 2022/0382660 | A1* | 12/2022 | Yoo | G06F 11/3075 |

FOREIGN PATENT DOCUMENTS

| | | | | |
|---|---|---|---|---|
| JP | 2000-112800 | A | | 4/2000 |
| JP | 2001109618 | A | * | 4/2001 |
| JP | 2007299284 | A | * | 11/2007 |
| JP | 2008-52570 | A | * | 3/2008 |
| JP | 2010191922 | A | * | 9/2010 |
| JP | 2012-094087 | A | | 5/2012 |
| JP | 2012-98966 | A | * | 5/2012 |
| JP | 2012-252489 | A | | 12/2012 |
| JP | 2013228812 | A | * | 11/2013 |
| JP | 2018-005324 | A | | 1/2018 |
| JP | 2018-132927 | A | | 8/2018 |
| JP | 2020-009190 | A | | 1/2020 |
| JP | 2020-154491 | A | | 9/2020 |
| JP | 7252703 | B2 | * | 4/2023 |
| JP | 7421196 | B2 | * | 1/2024 |
| KR | 2013-0037901 | A | * | 4/2013 |
| KR | 2022-0160972 | A | * | 12/2022 |

OTHER PUBLICATIONS

Notice of Reason for Refusal mailed on Jan. 31, 2023, received for JP Application 2022-565626, 8 pages including English Translation.
Notice of Reason for Refusal mailed on Jun. 13, 2023, received for JP Application 2022-565626, 8 pages including English Translation.
Decision to Grant mailed on Sep. 26, 2023, received for JP Application 2022-565626, 5 pages including English Translation.
Office Action dated Feb. 24, 2025, issued in corresponding DE patent application No. 11 2022 004 588.4 (36 pages; with English translation).

* cited by examiner

FIG. 3

500 OPERATION LOG FILE

| ROW | 501 APPLICATION INFORMATION | 502 OPERATED WINDOW INFORMATION | 503 COMMAND INFORMATION | 504 INPUT DEVICE OPERATION INFORMATION | 505 OPERATION TIME INFORMATION |
|---|---|---|---|---|---|
| 1 | Application_1 | Win_Main | Create Window | ", | 2022-01-20, 23:48:11:111 |
| 2 | Application_1 | Win_Main | Open ProgramWindow | Click, | 2022-01-20, 23:48:14:155 |
| 3 | Application_1 | Win_Program | Add Program1 | Click, | 2022-01-20, 23:48:17:403 |
| 4 | Application_1 | Win_UnitConfiguration | Add Configuration1 | Drop, | 2022-01-20, 23:49:11:112 |
| 5 | Application_1 | Win_Label | Add Label1 | Click, | 2022-01-20, 23:52:18:86 |
| 6 | Application_1 | Win_Program | Add Program1 aContact | F5, | 2022-01-21, 00:01:17:404 |
| 7 | Application_1 | Win_Program | Add Program1 bContact | F6, | 2022-01-21, 00:05:21:163 |
| 8 | Application_1 | Win_UnitConfiguration | Mod Configuration1 Unit2 | Drop, | 2022-01-21, 02:39:49:405 |
| 9 | Application_1 | Win_Label | Delete Label2 | Delete, | 2022-01-21, 02:43:23:320 |
| 10 | Application_1 | Win_Main | Save | Ctrl + S | 2022-01-21, 02:59:01:784 |
| 11 | Application_1 | Win_Main | Message001 | Click "OK", | 2022-01-21, 02:59:05:952 |

FIG. 4

| Storage target items | Changed items | Summaries of content of changes |
|---|---|---|
| ☑ | Program | Program 1: Addition, Modification, Deletion |
| ☐ | Unit configuration | Configuration 1: Addition, Modification |
| ☐ | Label | Label 1: Addition<br>Label 2: Deletion |

Summary information window (600), 601

RECORDING MEDIUM, ASSET MANAGEMENT DEVICE, LEARNING DEVICE, ASSET MANAGEMENT SYSTEM, AND ASSET MANAGEMENT METHOD

CROSS-REFERENCE TO RELATED APPLICATION

This application is a national stage application, pursuant to 35 U.S.C. § 371, of International Patent Application No. PCT/JP2022/017950, filed Apr. 15, 2022, the entire contents of which are incorporated herein by reference.

TECHNICAL FIELD

The present disclosure relates to an asset management program, an asset management device, a learning device, an asset management system, and an asset management method.

BACKGROUND ART

Systems are known that manage versions of file assets, such as sequential programs. Such a system, when storing file assets, stores old and new versions of the file assets, and information indicating the content of changes made to the file assets. The system can thus allow a user to check for a history of the content of changes. In general, the system acquires the information indicating the content of changes, which is manually input by the user after every change made to the file assets. Alternatively, the system may automatically generate the information after every change made to the file assets. For example, Patent Literature 1 discloses a technique of storing change history command information when any mismatching portion is found in a comparison between the latest CAD drawing and the CAD drawing under edition. The change history command information contains information on coordinates, information on figures and symbols, and CAD commands regarding the mismatching portion.

CITATION LIST

Patent Literature

Patent Literature 1: Unexamined Japanese Patent Application Publication No. H6-348768

SUMMARY OF INVENTION

Technical Problem

The above-mentioned system disclosed in Patent Literature 1 can achieve automatic generation of information indicating the content of changes, but requires the user to check for drawings displayed on a screen to find the changed portions. The user thus cannot readily recognize the changed portions.

The present disclosure is made in view of the aforementioned circumstances, and an objective of the present disclosure is to provide an asset management program, an asset management device, a learning device, an asset management system, and an asset management method capable of automatically generating a summary of content of a change made to a file asset.

Solution to Problem

In order to achieve the above objective, an asset management program according to the present disclosure causes a computer to function as: acquisition means for acquiring, from an operation log file generated in an engineering tool, operation history information indicating a history of operations on a file asset in the engineering tool; and extraction means for extracting, from the operation history information, summary information indicating a summary of content of a change made to the file asset. The extraction means causes the summary information to be stored into a database.

Advantageous Effects of Invention

The present disclosure can provide an asset management program, an asset management device, a learning device, an asset management system, and an asset management method capable of automatically generating a summary of content of a change made to a file asset.

BRIEF DESCRIPTION OF DRAWINGS

FIG. 3 is a diagram for describing an example of an operation log file according to Embodiment 1;

FIG. 4 is a diagram for describing an example of summary information according to Embodiment 1;

DESCRIPTION OF EMBODIMENTS

Embodiment 1

Figure 1:
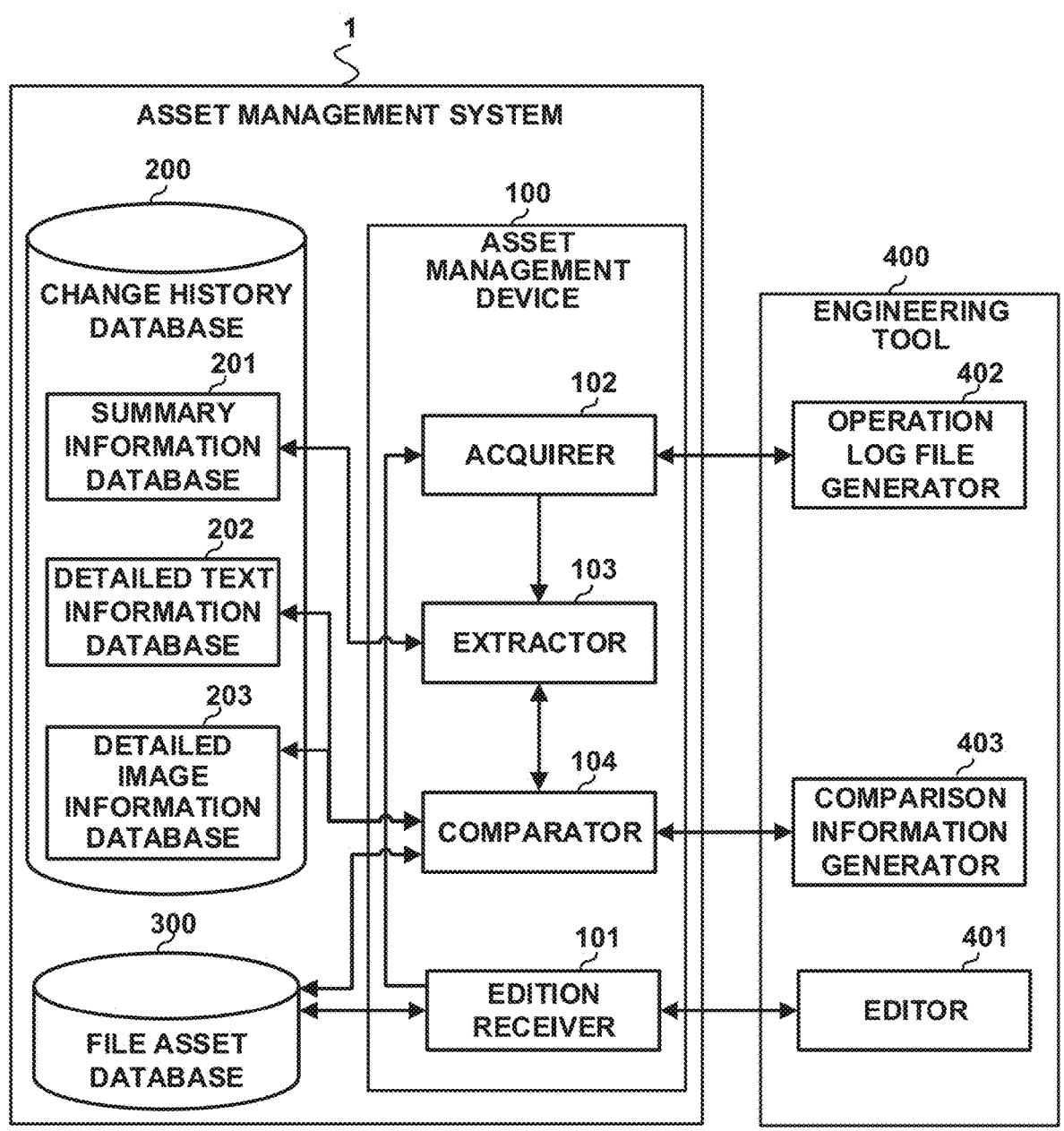
FIG. 1 illustrates a functional configuration of an asset management system according to Embodiment 1.

An asset management system 1 according to Embodiment 1 is aimed at managing file assets. As illustrated in FIG. 1, the asset management system 1 includes an asset management device 100, a change history database 200, and a file asset database 300. The asset management system 1 is connected to the engineering tool 400 such that the asset management system 1 is capable of wired communication via a network cable, which is not illustrated, or wireless communication with the engineering tool 400.

The file assets indicate data on files generated, edited, and used in the engineering tool 400. The file assets are files that define applications to be executed in the engineering tool, for example.

The asset management device 100 causes the file asset database 300 to store file assets generated, edited, and used in the engineering tool 400, and allows the engineering tool 400 to edit a file asset stored in the file asset database 300 in response to a request from the engineering tool 400. The asset management device 100 causes the file asset database 300 to store multiple versions of a file asset generated, edited, and used in the engineering tool 400. Upon the storage of the file asset into the file asset database 300, the asset management device 100 generates information indicating the content of a change from the old version to the new version of the file asset, and causes the change history database 200 to store the generated information. The generated information indicating the content of the change contains summary information indicating a summary of the content of the change, and detailed information indicating details of the content of the change.

The change history database 200 stores information relating to a history of changes made to the file asset. The change history database 200 includes a summary information database 201 that stores summary information, a detailed text information database 202 that stores text information as the detailed information, and a detailed image information database 203 that stores image information as the detailed information.

The file asset database 300 stores file assets generated, edited, and used in the engineering tool 400.

The engineering tool 400 generates, edits, and uses the file assets. The engineering tool 400 has a function of generating an operation log file and a function of generating comparison information, as is described below.

Figure 2:
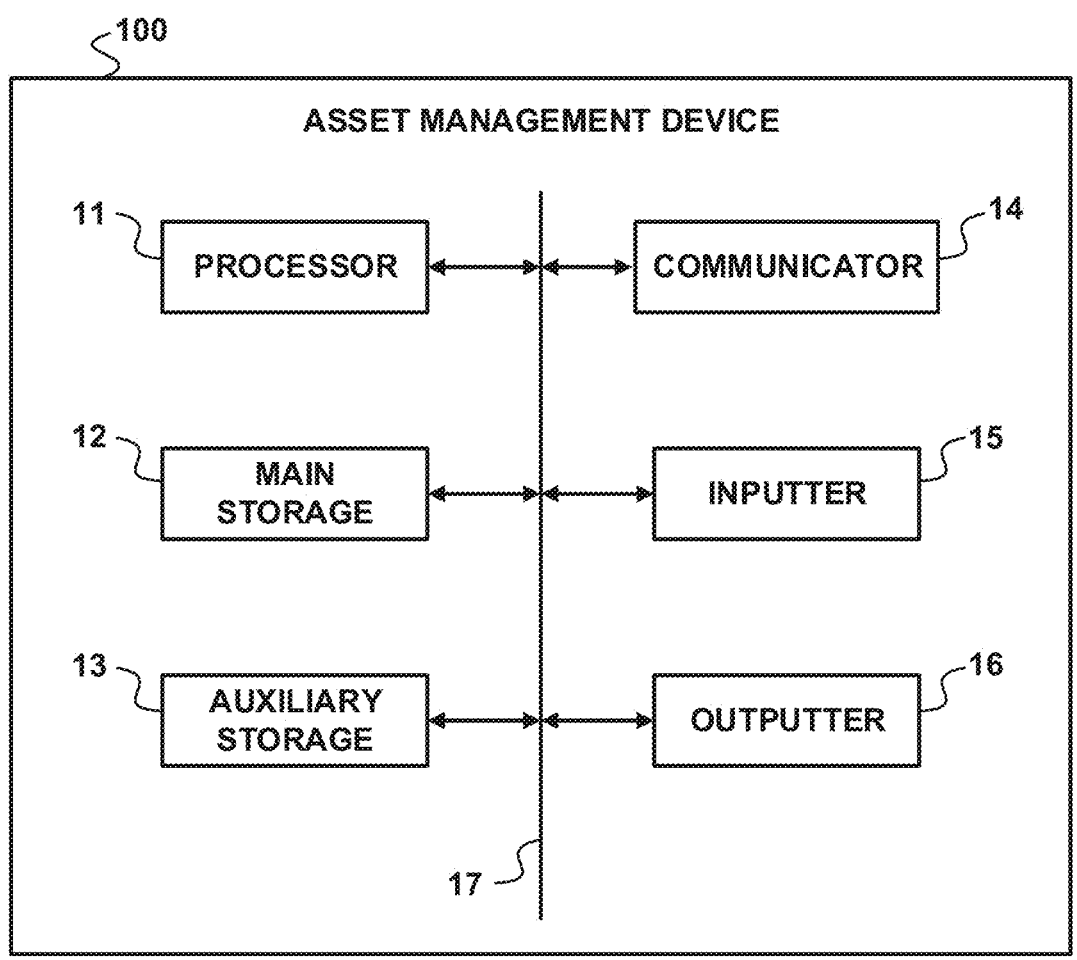
FIG. 2 is a block diagram illustrating a hardware configuration of an asset management device according to Embodiment 1.

FIG. 2 illustrates a hardware configuration of the asset management device 100.

The asset management device 100 includes a processor 11 that executes various processes, a main storage 12 that serves as a work area of the processor 11, an auxiliary storage 13 that stores various types of data to be used in the processes in the processor 11, a communicator 14 for communication with external apparatuses, and an inputter 15 that acquires input information, and an outputter 16 that presents various types of information. The main storage 12, the auxiliary storage 13, the communicator 14, the inputter 15, and the outputter 16 are each connected to the processor 11 via buses 17.

The processor 11 includes a central processing unit (CPU). The processor 11 executes a program stored in the auxiliary storage 13 and thereby performs various functions of the asset management device 100.

The main storage 12 includes a random access memory (RAM). The main storage 12 receives a program loaded from the auxiliary storage 13. The main storage 12 serves as a work area of the processor 11.

The auxiliary storage 13 includes a non-volatile memory, such as electrically erasable programmable read-only memory (EEPROM). The auxiliary storage 13 stores the program and various types of data used in processes in the processor 11. The auxiliary storage 13 provides the processor 11 with data to be used by the processor 11 and stores data fed from the processor 11 under the instructions from the processor 11.

The communicator 14 includes a network interface circuit for communication with external apparatuses. The communicator 14 receives signals from external apparatuses and outputs data indicated by the signals to the processor 11. The communicator 14 also transmits signals indicating the data output from the processor 11 to external apparatuses.

The inputter 15 includes an input device, such as input key or pointing device. The inputter 15 acquires information input by the user of the asset management device 100 and outputs the acquired information to the processor 11.

The outputter 16 includes an output device, such as liquid crystal display (LCD) or speaker. The outputter 16 may configure a touch screen integrated with the pointing device included in the inputter 15. The outputter 16 presents various types of information to the user under the instructions from the processor 11.

The asset management device 100 illustrated in FIG. 1 has functions described below. The asset management device 100 has functional components including an edition receiver 101 that receives an edition request, an acquirer 102 that acquires operation history information from an operation log file, an extractor 103 that extracts summary information from the operation history information, and a comparator 104 that acquires detailed information from comparison information.

The edition receiver 101 receives an edition request from the engineering tool 400. The edition receiver 101 is achieved by the processor 11 and the communicator 14.

For example, when the edition receiver 101 receives an edition request regarding a file asset of an application "Application_1" from the engineering tool 400, the edition receiver 101 transmits, to the engineering tool 400, a response containing the file asset of "Application_1" stored in the file asset database 300. When the edition receiver 101 receives a request for storing the edited file asset of "Application_1" from the engineering tool 400, the edition receiver 101 causes the edited file asset of "Application_1" to be stored into the file asset database 300.

The acquirer 102 acquires operation history information indicating a history of operations on the file asset in the engineering tool 400, from the operation log file generated in the engineering tool 400. The acquirer 102 is achieved by the processor 11 and the communicator 14. The acquirer 102 is an example of acquisition means.

The operation log file is a file generated in the engineering tool 400. In the operation log file, the content of operations performed on the file asset in the engineering tool 400 is indicated in time series.

FIG. 3 illustrates an example of the operation log file. An operation log file 500 contains, in association with each other, application information 501 each indicating an application operated in the engineering tool 400, operated window information 502 each indicating a window operated in the application, command information 503 each indicating a command executed in the operated window, input device operation information 504 each indicating an operation performed in the operated window with the input device, and operation time information 505 each indicating a time of occurrence of a change in the application information 501, the operated window information 502, the command information 503, or the input device operation information 504. The operation log file 500 also contains information on a user who performs the operation.

The operation history information is information indicating a history of content of operations on the file asset. In specific, the operation history information corresponds to the application information 501, the operated window information 502, the command information 503, the input device operation information 504, and the operation time information 505 of the operation log file 500 illustrated in FIG. 3.

For example, when the edition receiver 101 receives a request for storing the file asset of "Application_1" from the engineering tool 400, the acquirer 102 acquires the operation log file 500 illustrated in FIG. 3 regarding the file asset of "Application_1" from the engineering tool 400. The acquirer 102 then acquires, as the operation history information, the application information 501, the operated window information 502, the command information 503, the input device operation information 504, and the operation time information 505 illustrated in FIG. 3.

The extractor 103 extracts summary information indicating a summary of content of a change made to the file asset, from the operation history information. The extractor 103 is achieved by the processor 11. The extractor 103 is an example of extraction means.

The summary information is information indicating the summary of content of the change made to the file asset, and is generated by extraction from the operation history information. FIG. 4 illustrates an example of the summary information. For example, in response to extraction of summary information, a summary information window 600 illustrated in FIG. 4 is displayed on a screen of the asset management device 100. The summary information window 600 contains a summary information table 601. The summary information table 601 contains, in association with each other, storage target items for designating a changed item and a summary of content of a change to be stored, the changed items indicating the items subject to the changes made to the file asset, and the summaries of content of the changes made to the file asset.

The changed items and the summaries of content of the changes in the summary information table 601 illustrated in FIG. 4 correspond to the summary information extracted from the operation history information acquired from the operation log file 500 illustrated in FIG. 3. The summary information table 601 illustrated in FIG. 4 has checkboxes of the storage target items, with which the user designates summary information to be stored into the summary information database 201. For example, when the user of the asset management device 100 refers to the summary information and determines that content of the changed item and the summary of the content of the change is appropriate as the summary information, the user checks the checkbox of the storage target item. The user then performs an operation for instructing storage of the summary information. This operation causes the checked combination of the changed item and the summary of the content of the change to be stored into the summary information database 201 in the form of the summary information. The changed items and the summaries of the content of the changes contained in the summary information table 601 can be edited by the user. When the user determines that the content of the changed item and the summary of the content of the change is inappropriate as the summary information, the user can appropriately modify the information with the input device.

The following describes an extracting process in which the extractor 103 extracts changed items and summaries of content of the changes in the summary information table 601 illustrated in FIG. 4, from the operation history information acquired from the operation log file 500 illustrated in FIG. 3.

The extractor 103 identifies a changed item subject to the change made to the file asset, based on the operated window information 502 of the operation log file 500 illustrated in FIG. 3. The extractor 103 then generates the summary of content of the change made to the file asset, based on the command information 503 and the input device operation information 504.

For example, the extractor 103 reads records of the operation history information acquired by the acquirer 102 from the operation log file 500 illustrated in FIG. 3, one by one in the order of the times indicated by the operation time information 505. The extractor 103 then acquires the operated window information 502 on the read record. The extractor 103 then acquires the command information 503 on the read record. The extractor 103 then determines whether the command indicated by the command information 503 is an operation changing content of the file asset. Examples of the operation changing the content of the file asset include an operation of adding a program, and an operation of modifying the content of the program in "Application_1", and do not include an operation of opening a window of "Application_1" or an operation of storing "Application_1". For example, the extractor 103 determines each of the commands indicated by the command information 503 on lines 3 to 9 of the operation log file 500 illustrated in FIG. 3 to be the operation changing the content of the file asset. When the extractor 103 determines that the command indicated by the command information 503 is not the operation changing the content of the file asset, the extractor 103 determines whether the operation indicated by the input device operation information 504 is the operation changing the content of the file asset.

When the command indicated by the command information 503 or the operation indicated by the input device operation information 504 is the operation changing the content of the file asset, the extractor 103 further determines whether the operation changing the content of the file asset corresponds to an operation changing the fundamental element of the file asset. Examples of the operation changing the fundamental element of the file asset include an operation of adding or deleting a program, unit configuration, or label in "Application_1", and do not include an operation of modifying the content of a program, unit configuration, or label. For example, the extractor 103 determines each of the commands indicated by the command information 503 on lines 3 to 5 and 9 of the operation log file 500 illustrated in FIG. 3 to be the operation changing the fundamental element of the file asset. In contrast, the extractor 103 determines each of the commands indicated by the command information 503 on lines 6 to 8 of the operation log file 500 illustrated in FIG. 3 not to be the operation changing the fundamental element of the file asset.

When the extractor 103 determines the operation changing the content of the file asset to be an operation changing the fundamental element of the file asset, the extractor 103 identifies the changed item from the items indicated by the operated window information 502, and generates a summary of content of the change from the information indicated by the command information 503. For example, for the record on line 3 of the operation log file 500 illustrated in FIG. 3, the extractor 103 identifies the changed item to be "program", and generates a summary of content of the change indicating "addition of Program 1". Also, for the record on line 4 of the operation log file 500 illustrated in FIG. 3, the extractor 103 identifies the changed item to be "unit configuration", and generates a summary of content of the change indicating "addition of Configuration 1". For the record on line 5 of the operation log file 500 illustrated in FIG. 3, the extractor 103 identifies the changed item to be "label", and generates a summary of content of the change indicating "addition of Label 1". For the record on line 9 of the operation log file 500 illustrated in FIG. 3, the extractor 103 identifies the changed item to be "label", and generates a summary of content of the change indicating "deletion of Label 2".

In contrast, when the extractor 103 determines that the operation changing the content of the file asset does not correspond to the operation changing the fundamental element of the file asset, the extractor 103 identifies the changed item based on of the item indicated by the operated window information 502, and generates a summary of content of the change indicating a modification of a fundamental element contained in the command information 503. For example, for the record on line 6 of the operation log file 500 illustrated in FIG. 3, the extractor 103 identifies the changed item to be "program", and generates a summary of content of the change indicating "modification of Program 1". Also, for the record on line 7 of the operation log file 500 illustrated in FIG. 3, the extractor 103 identifies the changed item to be "program", and generates a summary of content of the change indicating "modification of Program 1". For the record on line 8 of the operation log file 500 illustrated in FIG. 3, the extractor 103 identifies the changed item to be "unit configuration", and generates a summary of content of the change indicating "modification of Configuration 1".

Based on the identified changed items and the generated summaries of content of the changes, the extractor 103 generates the summary information table 601 illustrated in FIG. 4.

The extractor 103 also causes the summary information database 201 to store the changed items and the summaries of content of the changes with the checked checkboxes of the storage target items in the summary information table 601 illustrated in FIG. 4, in the form of the summary information on the file asset of "Application_1".

The comparator 104 acquires detailed information indicating details of the content of the change, from comparison information generated by a comparison between the file asset before the change in the engineering tool 400 and the file asset after the change. The comparator 104 is achieved by the processor 11 and the communicator 14. The comparator 104 is an example of comparison means.

The comparison information is information generated by a comparison of the changed item with respect to the summary information between the file asset before the change and the file asset after the change. The comparison information is information generated in the engineering tool 400. For example, the comparison information contains a text indicating content of the differences for each of the changed items contained in the summary information. The comparison information also contains an image indicating content of the differences in the case where the content of the differences can be represented as an image in the engineering tool 400.

For example, the comparator 104 acquires the versions of the file asset of "Application_1" before and after the changes stored in the file asset database 300 and the summary information generated for "Application_1" and stored in the summary information database 201. The comparator 104 then transmits a request for acquisition of comparison information, which contains the file assets before and after the changes and the summary information, to the engineering tool 400. The comparator 104 then acquires the comparison information on "Application_1" from the engineering tool 400. The acquired comparison information contains texts and images indicating content of the differences for the individual changed items "program", "unit configuration", and "label" of "Application_1". For example, the comparison information contains "addition of Program 1", "addition of a contact point a in Program 1", and "addition of a contact point b in Program 1" as the texts indicating content of the differences in the changed item "program", and an image indicating content of the differences in the changed item "program". The comparison information also contains "addition of Configuration 1" and "modification of Unit 2 in Configuration 1" as the texts indicating content of the differences in the changed item "unit configuration", and an image indicating content of the differences. The comparison information further contains "addition of Label 1" and "deletion of Label 2" as the texts indicating content of the differences in the changed item "label", and an image indicating content of the differences.

The comparator 104 reads the acquired comparison information for each of the changed items of the summary information, associates the read texts and image with the changed items, and acquires as detailed information. For example, for the changed item "program", the comparator 104 acquires, as the detailed information, the texts "addition of Program 1", "addition of a contact point a in Program 1", and "addition of a contact point b in Program 1", and the image indicating content of the differences. Also, for the changed item "unit configuration", the comparator 104 acquires, as the detailed information, the texts "addition of Configuration 1" and "modification of Unit 2 in Configuration 1", and the image indicating content of the differences. For the changed item "label", the comparator 104 acquires the texts "addition of Label 1" and "deletion of Label 2", and the image indicating content of the differences. The comparator 104 causes the texts of the acquired detailed information to be stored into the detailed text information database 202 in the form of the detailed information on the file asset of "Application_1", and causes the images of the acquired detailed information to be stored into the detailed image information database 203 in the form of the detailed information on the file asset of "Application_1".

Figure 5:
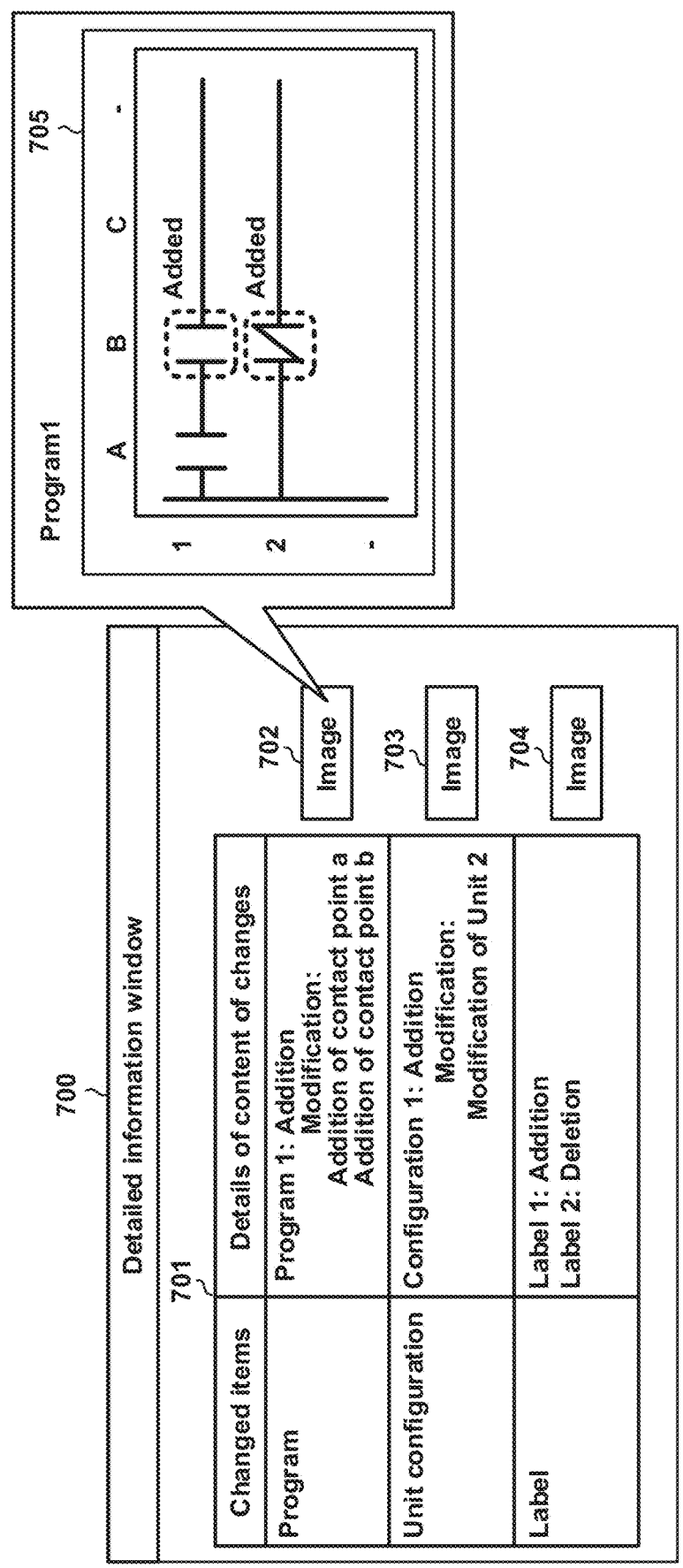
FIG. 5 is a diagram for describing an example of detailed information according to Embodiment 1.

FIG. 5 illustrates an example of the detailed information. A detailed information window 700 illustrated in FIG. 5 contains a detailed information table 701. The detailed information table 701 contains, in association with each other, changed items indicating items subject to changes made to the file asset, and details of content of the changes made to the file asset. The detailed information window 700 illustrated in FIG. 5 also has buttons 702 to 704 for displaying images associated with the changed items. For example, when the user selects the button 702 by click or mouseover, the screen displays an image 705 indicating content of the differences in the changed item "program". In response to selection of the button 703 by the user, the screen displays an image indicating content of the differences in the changed item "unit configuration". In response to selection of the button 704 by the user, the screen displays an image indicating content of the differences in the changed item "label".

The engineering tool 400 illustrated in FIG. 1 has functions described below. The engineering tool 400 has functional components including an editor 401 that edits a file asset, an operation log file generator 402 that generates an operation log file, and a comparison information generator 403 that generates comparison information.

The editor 401 edits the file asset stored in the file asset database 300, in accordance with an operation of the user of the engineering tool 400.

For example, at the start of the edition of the file asset of "Application_1" by the user of the engineering tool 400, the editor 401 transmits an edition request regarding the file asset of "Application_1" to the asset management device 100, and reads the file asset of "Application_1" contained in a response from the asset management device 100. The editor 401 also receives an operation of editing the file asset from the user. In response to an operation of storing the edited file asset of "Application_1" by the user, the editor 401 transmits a request for storing the file asset of "Application_1" to the asset management device 100.

The operation log file generator 402 generates an operation log file indicating the content of operations performed on the file asset in the engineering tool 400.

For example, in response to an operation performed on the file asset of "Application_1" by the user, the operation log file generator 402 generates the operation log file 500 indicating content of the operation performed on "Application_1".

The comparison information generator 403 identifies the changed item subject to the change made to the file asset based on the summary information, and generates comparison information on the identified changed item by a comparison between the file asset before the change and the file asset after the change.

For example, when the comparison information generator 403 receives a request for acquisition of comparison information, which contains the versions of the file asset of "Application_1" before and after the changes and the summary information, from the asset management device 100, then the comparison information generator 403 acquires texts and images indicating content of the differences for the individual changed items contained in the summary information, and generates comparison information containing the acquired texts and images. The comparison information generator 403 then transmits the generated comparison information to the asset management device 100, as a response to the request for acquisition of comparison information.

Figure 6:
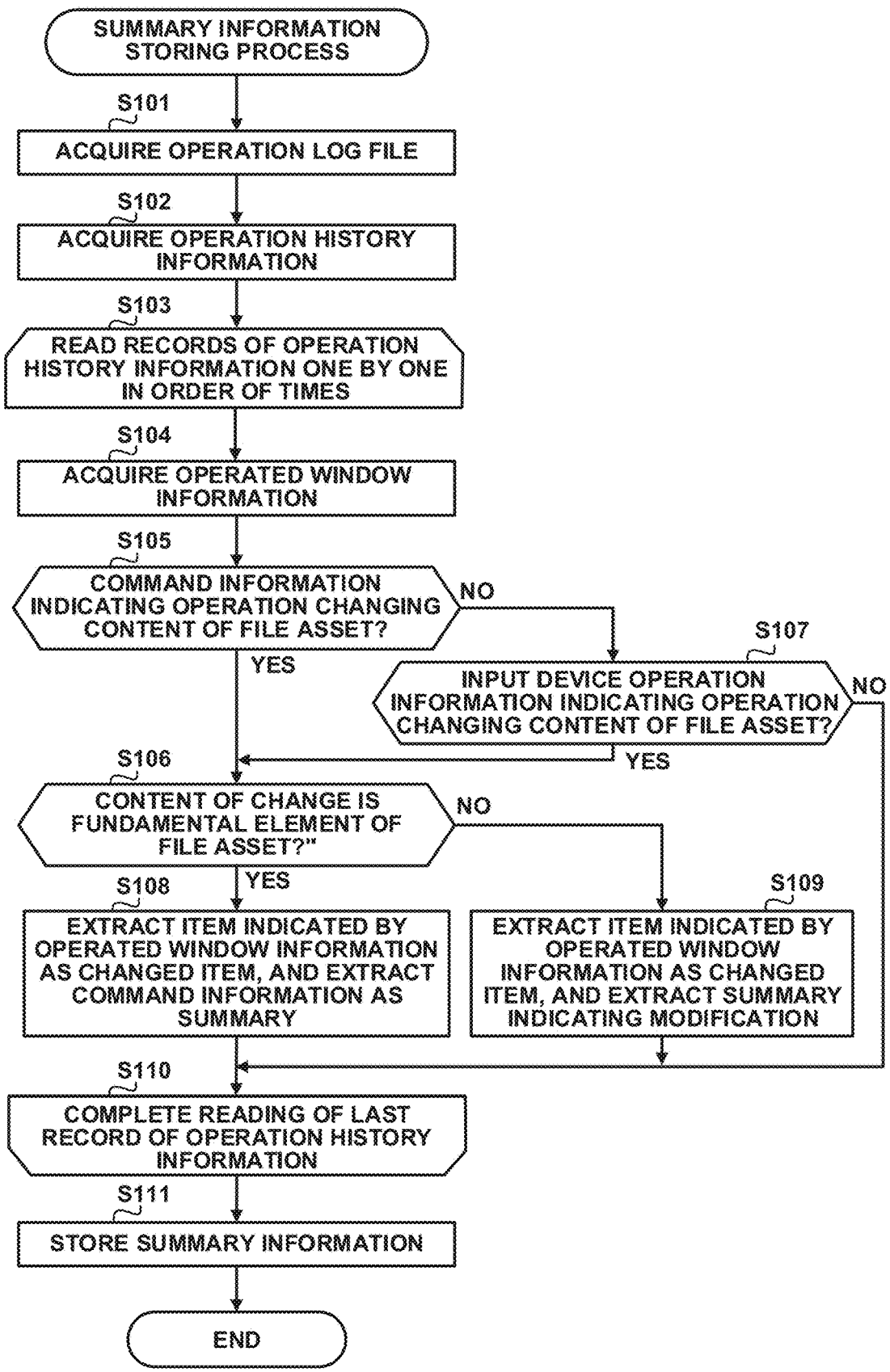
FIG. 6 is a flowchart illustrating a summary information storing process according to Embodiment 1.

A summary information storing process performed by the asset management device 100 according to the present embodiment is described with reference to FIG. 6. FIG. 6 is a flowchart illustrating the summary information storing process. The summary information storing process illustrated in FIG. 6 is executed in response to reception of a request for storing the file asset from the engineering tool 400, for example.

The acquirer 102 acquires an operation log file generated in the engineering tool 400 (Step S101).

For example, the acquirer 102 acquires the operation log file 500 illustrated in FIG. 3 from the engineering tool 400.

The acquirer 102 acquires operation history information indicating a history of operations on the file asset, from the acquired operation log file (Step S102).

For example, the acquirer 102 acquires, as the operation history information, the application information 501, the operated window information 502, the command information 503, the input device operation information 504, and the operation time information 505, from the operation log file 500 illustrated in FIG. 3.

The extractor 103 then reads the records of the operation history information one by one in the order of the times (Step S103).

For example, the extractor 103 reads the record on line 1 of the operation log file 500 illustrated in FIG. 3.

The extractor 103 then acquires the operated window information 502 on the read record (Step S104).

For example, the extractor 103 acquires the operated window information 502 "Win Main" on the record on line 1 of the operation log file 500 illustrated in FIG. 3.

The extractor 103 then determines whether the command indicated by the command information 503 on the read record is an operation changing the content of the file asset (Step S105). When determining that the command indicated by the command information 503 on the read record is the operation changing the content of the file asset (Step S105; YES), the extractor 103 determines whether the operation changing the content of the file asset corresponds to an operation changing the fundamental element of the file asset (Step S106). In contrast, when determining that the command indicated by the command information 503 on the read record is not the operation changing the content of the file asset (Step S105; NO), the extractor 103 determines whether the operation indicated by the input device operation information 504 is the operation changing the content of the file asset (Step S107).

In an exemplary case where the extractor 103 reads the record on line 3 of the operation log file 500 illustrated in FIG. 3, the extractor 103 determines the command indicated by the command information 503 "Add Program 1" on line 3 to be the operation changing the content of the file asset, and determines whether the command indicated by the command information 503 "Add Program 1" on line 3 corresponds to the operation changing the fundamental element of the file asset. In another exemplary case where the extractor 103 reads the record on line 1 of the operation log file 500 illustrated in FIG. 3, the extractor 103 determines the command indicated by the command information 503 "Create Window" on line 1 not to be the operation changing the content of the file asset, and determines whether the operation indicated by the input device operation information 504 "-," on line 1 is the operation changing the content of the file asset.

In Step S106, when determining that the operation changing the content of the file asset corresponds to the operation changing the fundamental element of the file asset (Step S106; YES), the extractor 103 identifies the item indicated by the operated window information 502 to be the changed item, and generates a summary of content of the change based on the information indicated by the command information 503 (Step S108). In contrast, when determining that the operation changing the content of the file asset does not correspond to the operation changing the fundamental element of the file asset (Step S106; NO), the extractor 103 identifies the item indicated by the operated window information 502 to be the changed item, and generates a summary of content of the change indicating a modification of a fundamental element contained in the command information 503 (Step S109).

In an exemplary case where the extractor 103 reads the record on line 3 of the operation log file 500 illustrated in FIG. 3, the extractor 103 determines the command indicated by the command information 503 "Add Program 1" on line 3 to be the operation changing the fundamental element of the file asset, identifies the item "program" indicated by the operated window information 502 "Win_Program" to be the changed item, and generates the summary of the content of the change indicating "addition of Program 1". In another exemplary case where the extractor 103 reads the record on line 6 of the operation log file 500 illustrated in FIG. 3, the extractor 103 determines that the command indicated by the command information 503 "Add Program 1 aContact" on line 6 does not correspond to the operation changing the fundamental element of the file asset, identifies the item "program" indicated by the operated window information 502 "Win_Program" to be the changed item, and generates the summary of the content of the change indicating "modification of Program 1".

In Step S107, when the extractor 103 determines that the operation indicated by the input device operation information 504 is the operation changing the content of the file asset (Step S107; YES), the process goes to Step S106. In contrast, when the extractor 103 determines that the operation indicated by the input device operation information 504 is not the operation changing the content of the file asset (Step S107; NO), the process goes to Step S110.

For example, when the extractor 103 determines the command indicated by the command information 503 on the read record not to be the operation changing the content of the file asset but determines the operation indicated by the input device operation information 504 to be the operation changing the content of the file asset, the extractor 103 determines whether the operation corresponds to the operation changing the fundamental element of the file asset, based on the command information 503 and the input device operation information 504. In an exemplary case where the extractor 103 reads the record on line 1 of the operation log file 500 illustrated in FIG. 3, the extractor 103 determines that the operation indicated by the input device operation information 504 "–," on line 1 is not the operation changing the content of the file asset, and the process goes to Step S110.

When determining that the extractor 103 has read the last record of the operation history information (Step S110), the extractor 103 causes the summary information to be stored into the summary information database 201 (Step S111). In contrast, when determining that the extractor 103 has not read the last record of the operation history information, the extractor 103 repeats Steps S103 to S110.

For example, when determining that the extractor 103 has read the record on line 11 of the operation log file 500 illustrated in FIG. 3, the extractor 103 causes the summary information database 201 to store the summary information on the file asset of "Application_1", which contains the changed items and the summaries of the content of the changes with the checked checkboxes of the storage target items in the summary information table 601 illustrated in FIG. 4. In contrast, when determining that the extractor 103 has not read the record on line 11 of the operation log file 500 illustrated in FIG. 3, the extractor 103 returns to Step S103, reads the record subsequent to the currently reading record, and executes Step S104 and the following steps.

Figure 7:
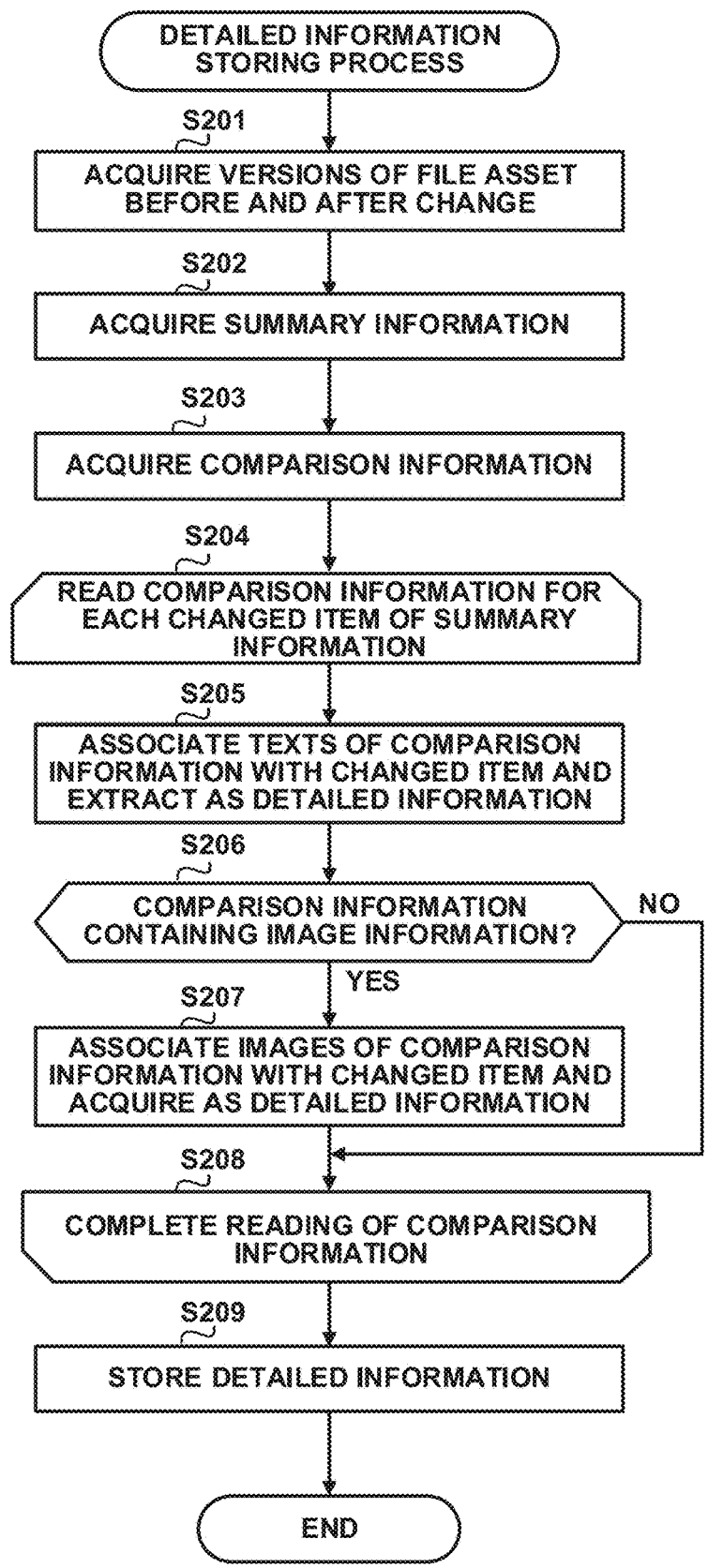
FIG. 7 is a flowchart illustrating a detailed information storing process according to Embodiment 1.

A detailed information storing process performed by the asset management device 100 according to the present embodiment is described with reference to FIG. 7. FIG. 7 is a flowchart illustrating the detailed information storing process. The detailed information storing process illustrated in FIG. 7 is executed, in response to storage of summary information on the file asset into the summary information database 201, for the file asset corresponding to the stored summary information, for example.

The comparator 104 acquires the file assets before and after the changes stored in the file asset database 300 (Step S201).

For example, in response to storage of the summary information generated for "Application_1" into the summary information database 201, the comparator 104 acquires the versions of the file asset of "Application_1" before and after the changes from the file asset database 300.

The comparator 104 also acquires the summary information stored in the summary information database 201 (Step S202).

For example, the comparator 104 acquires the summary information on "Application_1" from the summary information database 201.

The comparator 104 then acquires the comparison information from the engineering tool 400 (Step S203).

For example, the comparator 104 transmits a request for acquisition of comparison information, which contains the versions of the file asset of "Application_1" before and after the changes and the summary information, to the engineering tool 400. The comparator 104 then acquires the comparison information on "Application_1" from the engineering tool 400.

The comparator 104 then reads the acquired comparison information for each of the changed items of the summary information (Step S204).

For example, the comparator 104 reads, for the changed item "program", the texts of the comparison information, including "addition of Program 1", "addition of a contact point a in Program 1", and "addition of a contact point b in Program 1", and the image of the comparison information.

The comparator 104 then associates the texts of the comparison information with the changed item, and extracts the associated texts and the changed item as the detailed information (Step S205)

For example, the comparator 104 associates the texts "addition of Program 1", "addition of a contact point a in Program 1", and "addition of a contact point b in Program 1", with the changed item "program".

The comparator 104 then determines whether the comparison information contains an image (Step S206). When determining that the comparison information contains the image (Step S206; YES), the comparator 104 associates the image of the comparison information with the changed item and acquires as detailed information (Step S207). In contrast, when the comparator 104 determines that the comparison information does not contain the image (Step S206; NO), the process goes to Step S208.

For example, the comparator 104 associates the image indicating content of the differences in the changed item "program" contained in the comparison information with the changed item "program", and acquires as detailed information. In contrast, when the comparator 104 determines that the comparison information does not contain the image indicating content of the differences in the changed item "program", the process goes to Step S208.

When determining that the comparator 104 has completely read the acquired comparison information (Step S208), the comparator 104 causes the acquired detailed information to be stored into the detailed text information database 202 and the detailed image information database 203 (Step S209). In contrast, when determining that the comparator 104 has not completely read the acquired comparison information, the comparator 104 repeats Steps S204 to S208.

For example, when determining that the comparator 104 has completely read the comparison information on the changed items "program", "unit configuration", and "label", then the comparator 104 causes the extracted texts to be stored into the detailed text information database 202 in association with the changed items, and causes the extracted images to be stored into the detailed image information database 203 in association with the changed items. In contrast, when determining that the comparator 104 has not completely read the comparison information on the changed items "program", "unit configuration", and "label", then the comparator 104 returns to Step S204, reads the changed item subsequent to the currently reading changed item, and then executes Step S205 and the following steps.

This embodiment can achieve automatic generation of summaries of changes made to a file asset, and thus allow the user to skip the process of inputting information indicating a history of changes. The embodiment can therefore reduce the number of tasks in management of file assets.

Since the asset management system according to the embodiment automatically generates summaries of content of changes, the content of the stored history of changes has no dispersion caused by different inputs from the user. This can thus prevent occurrence of a problem such as failing to retrieve related records with the same retrieval keyword, and reduce the number of tasks in the process of checking for the versions of file assets.

The stored summaries of content of changes in the embodiment can allow the user to readily check for the content of changes. The stored details of the content of the changes can also allow the user to skip the process of checking for every single file asset, and reduce the number of tasks of comparing file assets with each other.

The storage of the summaries of content of changes in the embodiment can allow the user to use the summaries as a clue to identification of a version of the file asset to be checked for. The storage of the details of content of changes in the forms of texts and images enables readily checking the details of content of changes without referring to every single file asset displayed on a screen.

The user can select whether the summary information presented by the asset management device 100 is to be stored into the database, and modify the summary information according to the embodiment. The embodiment can thus secure the validity of the summary information stored in the asset management system.

Embodiment 2

The asset management system 1 according to Embodiment 2 has a function of inferring summary information.

Figure 8:
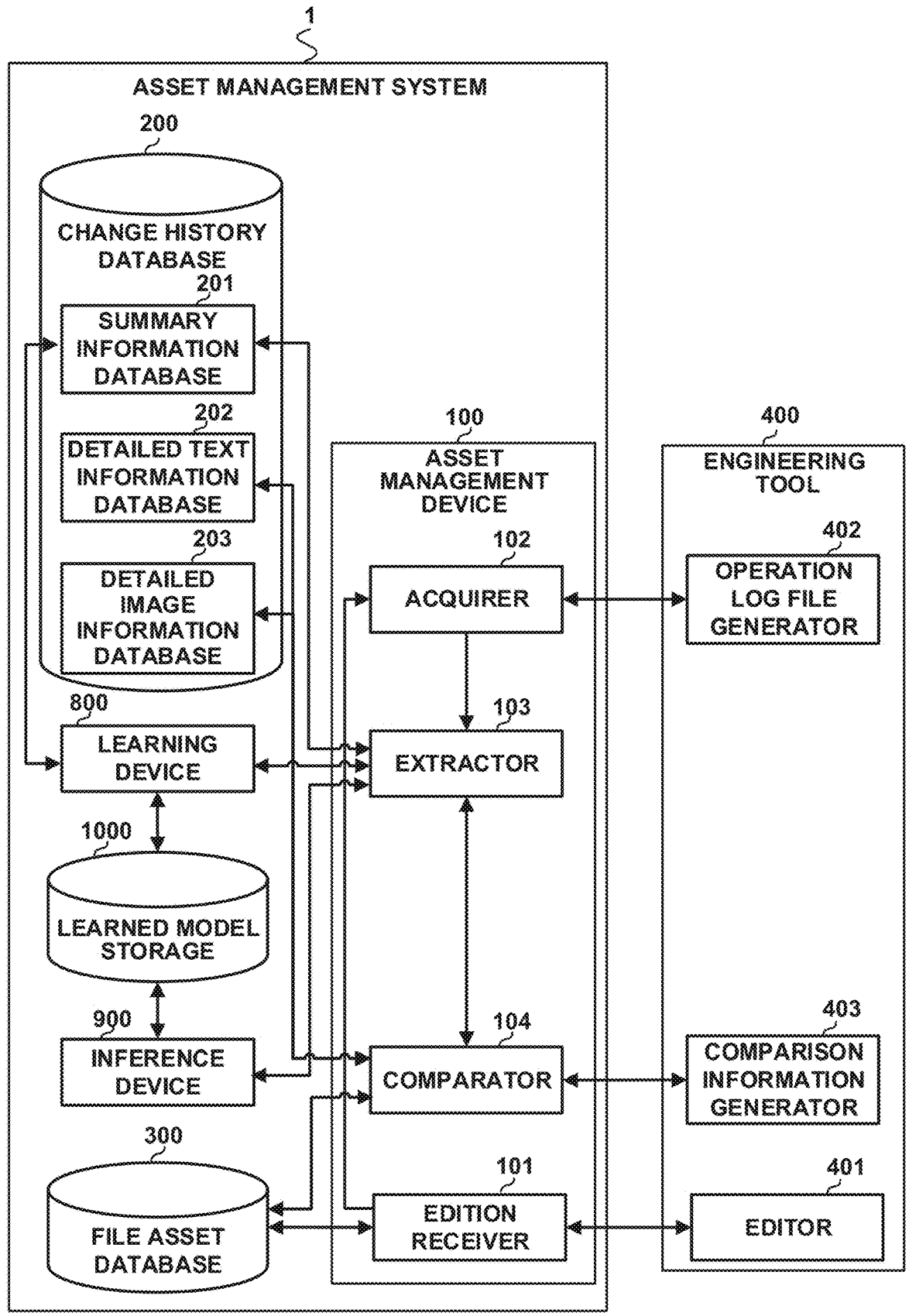
FIG. 8 illustrates a functional configuration of an asset management system according to Embodiment 2.

As illustrated in FIG. 8, the asset management system 1 according to Embodiment 2 includes an asset management device 100, a change history database 200, a file asset database 300, a learning device 800, an inference device 900, and a learned model storage 1000. The following description focuses on the functions of the asset management system 1 different from those in Embodiment 1.

The learning device 800 and the inference device 900 according to the embodiment each have the hardware configuration illustrated in FIG. 2.

The extractor 103 in the asset management system 1 according to Embodiment 2 acquires summary information in cooperation with the learning device 800 and the inference device 900, without extracting the summary information from the operation history information acquired by the acquirer 102. In specific, the extractor 103 acquires the summary information, which is inferred by the inference device 900 using a learned model generated by the learning device 800.

Figure 9:
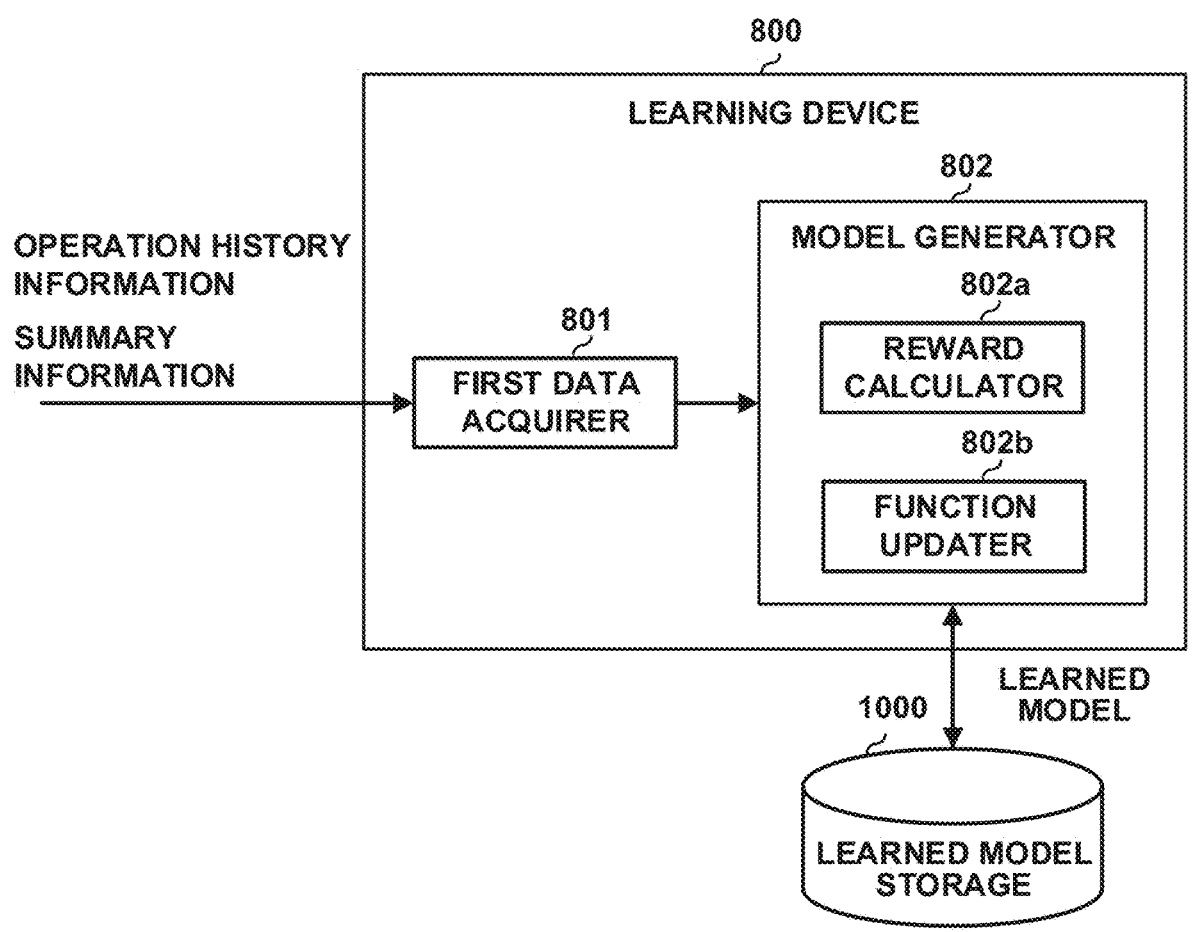
FIG. 9 illustrates a functional configuration of a learning device according to Embodiment 2.

FIG. 9 illustrates a functional configuration of the learning device 800 included in the asset management system 1. The learning device 800 includes a first data acquirer 801 and a model generator 802.

The first data acquirer 801 acquires, as learning data, the summary information stored in the summary information database 201 and the operation history information acquired by the acquirer 102. The operation history information contains the application information 501, the operated window information 502, the command information 503, the input device operation information 504, and the operation time information 505. The summary information contains the changed items and the summaries of the content of the changes. The first data acquirer 801 is achieved by the processor 11 and the communicator 14. The first data acquirer 801 is an example of first data acquisition means.

The model generator 802 learns the summary information to be stored into the summary information database 201, based on the learning data containing the summary information and the operation history information. That is, the model generator 802 generates a learned model for inferring summary information to be stored into the summary information database 201 from the operation history information. The model generator 802 is achieved by the processor 11 and the communicator 14. The model generator 802 is an example of model generation means.

The model generator 802 uses a learning algorithm, examples of which include widely known algorithms, such as supervised learning algorithms, unsupervised learning algorithms, and reinforcement learning algorithms. The following description focuses on an example involving reinforcement learning. In the reinforcement learning, an agent (action subject) in a certain environment observes the current state (parameters of the environment) and decides the action to take. The agent performs an action, which dynamically varies the environment. The agent then obtains a reward depending on the variation in the environment. The agent repeats these steps, and learns a strategy that maximizes the reward through a series of actions. Well-known representative examples of the reinforcement learning include Q-learning and TD-learning. In an exemplary case of Q-learning, a general update expression of an action-value function Q (s, a) is represented by Expression 1 below.

$$Q(s_t, a_t) \leftarrow Q(s_t, a_t) + \alpha(r_{t+1} + \gamma \max_a Q(s_{t+1}, a) - Q(s_t, a_t)) \quad \text{[Expression 1]}$$

In Expression 1, $s_t$ indicates a state of the environment at a time t, and $a_t$ indicates an action at the time t. The action $a_t$ varies the state into a state $s_{t+1}$. $r_{t+1}$ indicates a reward to be obtained depending on the variation in the state, $\gamma$ indicates a discount rate, and a indicates a learning coefficient. $\gamma$ has a range of $0 < \gamma \leq 1$, and $\alpha$ has a range of $0 < \alpha \leq 1$. The agent learns the best action $a_t$ in the state $s_t$ at the time t, in which the action $a_t$ corresponds to summary information and the state $s_t$ corresponds to operation history information.

When the action value Q of the action a having the highest Q value at the time t+1 is higher than the action value Q of the action a taken at the time t, the update expression represented by Expression 1 increases the action value Q. In the opposite case, the update expression decreases the action value Q. In other words, the action-value function Q (s, a) is updated such that the action value Q of the action a at the time t approaches the best action value at the time t+1. The best action value in the certain environment thus sequentially propagates to the action values in the previous environments.

In the above-described case where the learned model is generated by reinforcement learning, the model generator 802 includes a reward calculator 802a and a function updater 802b.

The reward calculator 802a calculates a reward based on the summary information and the operation history information. The reward calculator 802a calculates a reward r based on the validity of the summary information. The validity of the summary information is defined by the number of the changed items or the summaries of the content of the changes with the checked checkboxes of the storage target items of the summary information window 600, and the number of the changed items or the summaries of the content of the changes to be corrected, for example. The changed items and the summaries of the content of the changes with the checked checkboxes are information that the user determines to be appropriate as summary information, for example. The changed items or the summaries of the content of the changes to be corrected are information that the user determines to be inappropriate as summary information. The summary information is thus deemed to have higher validity for a larger number of the changed items or the summaries the content of the changes with the checked checkboxes. The summary information is deemed to have higher validity for a smaller number of the changed items or the summaries the content of the changes to be corrected. Higher validity of the summary information leads to a higher reward r (for example, a reward "1"), whereas lower validity of the summary information leads to a lower reward r (for example, a reward "-1").

The function updater 802b updates the function for determining summary information to be stored into the summary information database 201 in accordance with the reward calculated by the reward calculator 802a, and outputs the updated function to the learned model storage 1000. In an exemplary case of Q-learning, the function for determining summary information to be stored into the summary information database 201 is the action-value function Q ($s_t$, $a_t$) represented by Expression 1.

The above-described learning process is repeated. The learned model storage 1000 stores the action-value function Q ($s_t$, $a_t$) updated by the function updater 802b, that is, the learned model.

Figure 10:
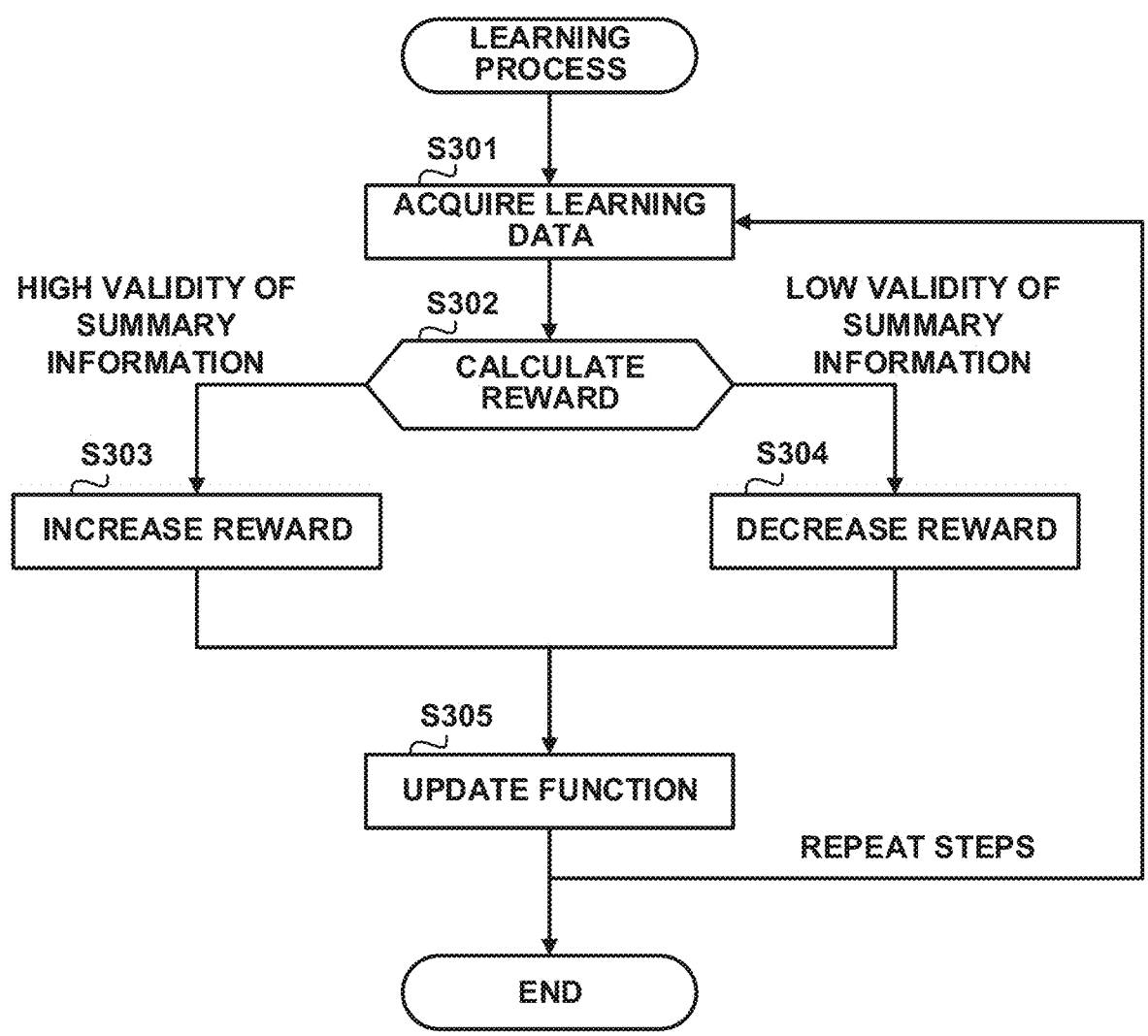
FIG. 10 is a flowchart illustrating a learning process executed in the learning device according to Embodiment 2.

The learning process executed by the learning device 800 is described below with reference to FIG. 10. FIG. 10 is a flowchart illustrating a learning process executed by the learning device 800.

The first data acquirer 801 acquires the summary information and the operation history information as learning data (Step S301).

The model generator 802 calculates a reward based on the summary information and the operation history information (Step S302). In specific, the reward calculator 802a acquires the summary information and the operation history information, and determines to increase the reward (Step S303), or decrease the reward (Step S304), based on the validity of the summary information.

The reward calculator 802a, when determining to increase the reward, increases the reward in Step S303. In contrast, the reward calculator 802a, when determining to decrease the reward, decreases the reward in Step S304.

Based on the reward calculated by the reward calculator 802a, the function updater 802b updates the action-value function Q ($s_t$, $a_t$) represented by Expression 1, which is stored in the learned model storage 1000 (Step S305).

The learning device 800 repeats Steps S301 to S305 described above. The learned model storage 1000 stores the resulting action-value function Q ($s_t$, $a_t$) as the learned model.

Although the learned model storage 1000 that stores the learned model is disposed outside the learning device 800 according to the embodiment, the learned model storage 1000 may be included in the learning device 800.

Figure 11:
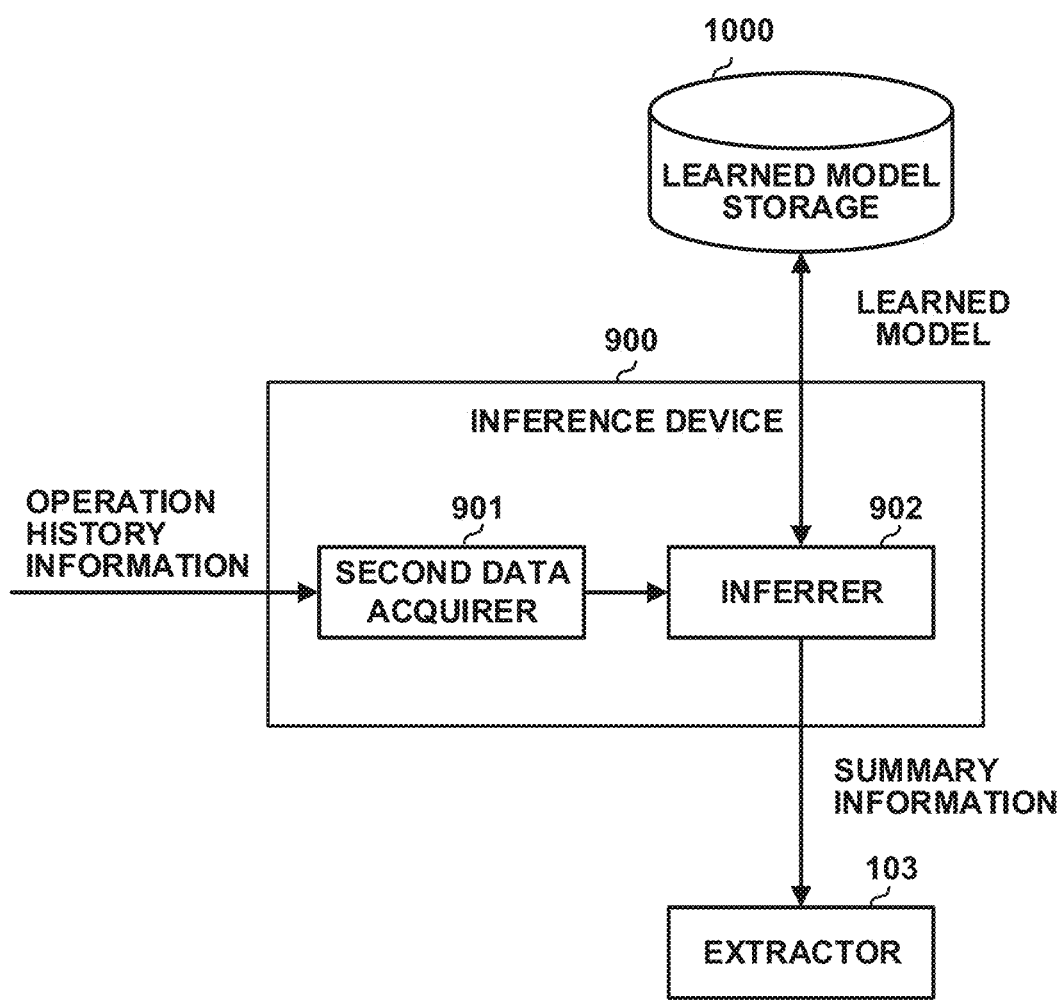
FIG. 11 illustrates a functional configuration of an inference device according to Embodiment 2.

FIG. 11 illustrates a functional configuration of the inference device 900 included in the asset management system 1. The inference device 900 includes a second data acquirer 901 and an inferrer 902.

The second data acquirer 901 acquires operation history information. The operation history information contains the application information 501, the operated window information 502, the command information 503, the input device operation information 504, and the operation time information 505, regarding operations in the engineering tool 400. The second data acquirer 901 is achieved by the processor 11 and the communicator 14. The second data acquirer 901 is an example of second data acquisition means.

The inferrer 902 infers summary information to be stored into the summary information database 201 using the learned model. The summary information contains the changed items and the summaries the content of the changes. That is, the inferrer 902 inputs the operation history information acquired by the second data acquirer 901 into the learned model, and thus infers summary information to be stored into the summary information database 201, which is appropriate for the input operation history information. The inferrer 902 is achieved by the processor 11 and the communicator 14. The inferrer 902 is an example of inference means.

Although the summary information to be stored into the summary information database 201 is output using the learned model learned by the model generator 802 in the asset management system 1 in the embodiment, the summary information to be stored into the summary information database 201 may be output using a learned model acquired from another asset management system 1.

Figure 12:
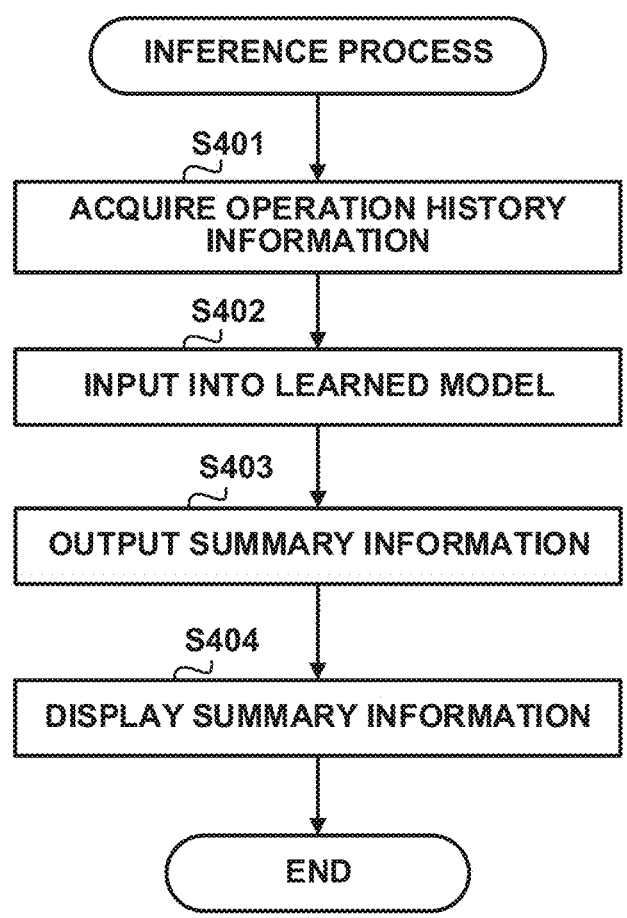
FIG. 12 is a flowchart illustrating an inference process executed in the inference device according to Embodiment 2.

A process of inferring summary information to be stored into the summary information database 201 performed using the inference device 900 is described with reference to FIG. 12. FIG. 12 is a flowchart illustrating an inference process executed by the asset management system 1.

The second data acquirer 901 acquires the operation history information (Step S401).

The inferrer 902 inputs the acquired operation history information into the learned model stored in the learned model storage 1000, and thus infers summary information to be stored into the summary information database 201 (Step S402).

The inferrer 902 then outputs the inferred summary information to be stored into the summary information database 201, to the asset management device 100 (Step S403).

Based on the output summary information to be stored into the summary information database 201, the asset management device 100 causes the screen to display the summary information on the file asset (Step S404).

This embodiment can achieve automatic determination of summary information to be stored into the database by means of learning and inference. The embodiment can therefore reduce the number of tasks in management of file assets.

The embodiment can allow the user to select whether to store summary information into the database to be used as learning data, and modify the summary information, and thus establish validity of the summary information that is necessary in the learning phase.

Although the inferrer 902 uses a reinforcement learning algorithm in the embodiment, this configuration is a mere example. Applicable examples of the learning algorithm also include supervised learning algorithms, unsupervised learning algorithms, and semi-supervised learning algorithms, as well as reinforcement learning algorithms.

The model generator 802 may also use a deep learning algorithm, which involves learning of extraction of feature quantities themselves. Alternatively, the model generator 802 may execute machine learning in accordance with another widely known procedure, such as neural network, inductive logic programming, or support vector machine.

The learning device 800 and the inference device 900 may each be a device separate from the asset management system 1 and connected to the asset management system 1 via a network, for example. The learning device 800 and the inference device 900 may also be included in the asset management device 100. The learning device 800 and the inference device 900 may also be located in a cloud server. The learning device 800 and the inference device 900 may also be integrated into a single device. Alternatively, the learning device 800, the inference device 900, and the learned model storage 1000 may be integrated into a single device.

The model generator 802 may learn summary information to be stored into the summary information database 201 using learning data acquired from multiple asset management systems 1. The model generator 802 may learn summary information to be stored into the summary information database 201, using learning data acquired from multiple asset management systems 1 installed in the same area, or using learning data collected from multiple asset management systems 1 independently operating in different areas. During the process, another asset management system 1 may be added to the target systems from which learning data is collected, or an asset management system 1 may be excluded from the target systems. Alternatively, the learning device 800 that has learned the summary information to be stored into the summary information database 201 for a certain asset management system 1 may be applied to another asset management system 1, and relearn and update summary information to be stored into the summary information database 201 for the other asset management system 1.

Modification

The embodiments of the present disclosure described above may be modified or applied in various forms to implement the present disclosure.

Although the detailed information storing process illustrated in FIG. 7 is executed in response to storage of summary information into the summary information database 201 in the above-described embodiments, this configuration is a mere example. The detailed information storing process illustrated in FIG. 7 may be executed at any timing after storage of summary information on the file asset to be subject to the detailed information storing process.

Although the engineering tool 400 generates comparison information in the above-described embodiments, this configuration is a mere example. The asset management device 100 may have the function of the comparison information generator 403 and generate comparison information.

An operational program that defines the operations of the asset management device 100 according to the above-described embodiments may be applied to an existing personal computer or information terminal device, and thus cause the personal computer or information terminal device to function as the asset management device 100 according to the embodiments.

Such a program may be distributed by any procedure. For example, the program may be stored in a non-transitory computer-readable recording medium, such as compact disk read-only memory (CD-ROM), digital versatile disk (DVD), or memory card, and distributed. The program may also be distributed via a communication network, such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide an asset management program, an asset management device, a learning device, an asset management system, and an asset management method capable of automatically generating a summary of content of a change made to a file asset.

REFERENCE SIGNS LIST

1 Asset management system
11 Processor
12 Main storage
13 Auxiliary storage
14 Communicator
15 Inputter
16 Outputter
17 Bus
100 Asset management device
101 Edition receiver
102 Acquirer
103 Extractor
104 Comparator
200 Change history database
201 Summary information database
202 Detailed text information database
203 Detailed image information database
300 File asset database
400 Engineering tool
401 Editor
402 Operation log file generator
403 Comparison information generator
500 Operation log file
600 Summary information window
601 Summary information table
700 Detailed information window
701 Detailed information table
702 to 704 Button
705 Image
800 Learning device
801 First data acquirer
802 Model generator
802a Reward calculator
802b Function updater
900 Inference device
901 Second data acquirer
902 Inferrer
1000 Learned model storage

The invention claimed is:

1. A non-transitory computer-readable recording medium storing an asset management program for causing a computer to execute processing, the processing comprising:
    acquiring, from an operation log file generated in an engineering tool, operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system;

extracting, from the operation history information, summary information indicating a summary of content of a change made to the file asset;

displaying the summary information in the form of a summary information table on a user interface of an output device, the summary information table including a first column having checkboxes for storage target items, a second column of changed items, and a third column of a summary of contents of the changes made to the file asset;

in response to a user selecting one of the checkboxes for the storage target items, causing the summary information for the selected checkbox to be stored into a database;

acquiring, from comparison information, detailed information indicating details of the content of the change, the comparison information being generated by a comparison between the file asset before the change made in the engineering tool and the file asset after the change using the summary information;

displaying the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label;

in response to a user selecting one of the buttons, displaying an image indicating content of the difference in a corresponding one of the changed items; and causing the detailed information to be stored into the database, wherein the detailed information window is separate from the summary information table, and the processing improves efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

2. The recording medium according to claim 1, wherein the comparison information contains a text indicating content of a difference between the file asset before the change made in the engineering tool and the file asset after the change, and the image indicating the content of the difference.

3. A non-transitory computer-readable recording medium storing an asset management program for causing a computer to execute processing, the processing comprising:

acquiring, from an operation log file generated in an engineering tool, operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system;

extracting, from the operation history information, summary information indicating a summary of content of a change made to the file asset;

displaying the summary information in the form of a summary information table on a user interface of an output device, the summary information table including a first column having checkboxes for storage target items, a second column of changed items, and a third column of a summary of contents of the changes made to the file asset; and in response to a user selecting one of the checkboxes for the storage target items, causing the summary information for the selected checkbox to be stored into a database, wherein the file asset is a file defining an application to be executed in the engineering tool, and the processing that the asset management program causes the computer to execute further includes acquiring, as the operation history information, from the operation log file, application information indicating the application executed in the engineering tool, operated window information indicating a window operated in the application, command information indicating a command executed in the operated window, input device operation information indicating an operation performed in the operated window with an input device, and operation time information indicating a time of occurrence of a change in the application information, the operated window information, the command information, or the input device operation information, identifying, based on the operated window information, a changed item subject to the change made to the file asset, generating, based on the command information and the input device operation information, the summary of the content of the change made to the file asset, extracting, as the summary information, the changed item and the summary of the content of the change;

acquiring, from comparison information, detailed information indicating details of the content of the change, the comparison information being generated by a comparison between the file asset before the change made in the engineering tool and the file asset after the change using the summary information, displaying the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label, in response to a user selecting one of the buttons, displaying an image indicating content of the difference in a corresponding one of the changed items, and causing the detailed information to be stored into the database, the detailed information window is separate from the summary information table, and the processing improves efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

4. The recording medium according to claim 3, wherein the comparison information contains
   a text indicating content of a difference between the file asset before the change made in the engineering tool and the file asset after the change, and
   the image indicating the content of the difference.

5. The non-transitory computer-readable recording medium according to claim 3, wherein the comparison information contains a text indicating content of a difference between the file asset before the change made in the engineering tool and the file asset after the change, and the image indicating the content of the difference.

6. An asset management device, comprising:
   a storage; and
   processing circuitry to
   acquire, from an operation log file generated in an engineering tool, operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system,
   extract, from the operation history information, summary information indicating a summary of content of a change made to the file asset,
   display the summary information in the form of a summary information table on a user interface on an output device, the summary information table including a first column having checkboxes for storage target items, a second column of changed items, and a third column of a summary of contents of the changes made to the file asset;
   in response to a user selecting one of the checkboxes for the storage target items, cause the summary information for the selected checkbox to be stored into a database;
   acquire, from comparison information, detailed information indicating details of the content of the change, the comparison information being generated by a comparison between the file asset before the change made in the engineering tool and the file asset after the change using the summary information;
   display the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label;
   in response to a user selecting one of the buttons, display an image indicating content of the difference in a corresponding one of the changed items; and
   cause the detailed information to be stored into the database,
   wherein
   the detailed information window is separate from the summary information table, and
   the processing circuitry improves efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

7. The non-transitory computer-readable recording medium according to claim 6, wherein the comparison information contains a text indicating content of a difference between the file asset before the change made in the engineering tool and the file asset after the change, and the image indicating the content of the difference.

8. An asset management system, comprising:
   a storage;
   a database; and
   processing circuitry to
   acquire, from an operation log file generated in an engineering tool, operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system,
   extract, from the operation history information, summary information indicating a summary of content of a change made to the file asset,
   display the summary information in the form of a summary information table on a user interface of an output device, the summary information table including a first column having checkboxes for storage target items, a second column of changed items, and a third column of a summary of contents of the changes made to the file asset, and
   in response to a user selecting one of the checkboxes for the storage target items, cause the summary information for the selected checkbox to be stored into the database, and
   acquire, from comparison information, detailed information indicating details of the content of the change, the comparison information being generated by a comparison between a file asset before the change made in the engineering tool and a file asset after the change using the summary information,
   display the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label, in response to a user selecting one of the buttons, display an image indicating content of the differenced in a corresponding one of the changed items, wherein the database stores the summary information and the detailed information, the processing circuitry causes the detailed information to be stored into the database, the detailed information window is separate from the summary information table, and the processing circuitry improves efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

9. An asset management method, comprising:

acquiring operation history information from an operation log file generated in an engineering tool, the operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system;

extracting summary information from the operation history information, the summary information indicating a summary of content of a change made to the file asset; and displaying the summary information in the form of a summary information table on a user interface of an output device, the summary information table including a first column having checkboxes for storage target items, a second column of changed items, and a third column of a summary of contents of the changes made to the file asset;

in response to a user selecting one of the checkboxes for the storage target items, causing for the selected checkbox to be stored into a database;

acquiring, from comparison information, detailed information indicating details of the content of the change, the comparison information being generated by a comparison between the file asset before the change made in the engineering tool and the file asset after the change using the summary information;

displaying the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label;

in response to a user selecting one of the buttons, displaying an image indicating content of the difference in a corresponding one of the changed items; and causing the detailed information to be stored into the database, wherein the detailed information window is separate from the summary information, and the method further comprises improving efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

10. An asset management device, comprising:

a storage; and processing circuitry to acquire, from an operation log file generated in an engineering tool, operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system, extract, from the operation history information, summary information indicating a summary of content of a change made to the file asset, display the summary information in the form of a summary information table on a user interface of an output device, the summary information table including a first column having checkboxes for storage target items, a second column of changed items, and a third column of a summary of contents of the changes made to the file asset, in response to a user selecting one of the checkboxes for the storage target items, cause the summary information for the selected checkbox to be stored into a database, acquire, from comparison information, detailed information indicating details of the content of the change, the comparison information being generated by a comparison between the file asset before the change made in the engineering tool and the file asset after the change using the summary information, display the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label, in response to a user selecting one of the buttons, display an image indicating content of the difference in a corresponding one of the changed items, and cause the detailed information to be stored into the database, wherein the detailed information window is separate from the summary information table, the file asset is a file defining an application to be executed in the engineering tool, the processing circuitry acquires, as the operation history information, from the operation log file, application information indicating the application executed in the engineering tool, operated window information indicating a window operated in the application, command information indicating a command executed in the operated window, input device operation information indicating an operation performed in the operated window with an input device, and operation time information indicating a time of occurrence of a change in the application information, the operated window information, the command information, or the input device operation information, identifies, based on the operated window information, a changed item subject to the change made to the file asset, generates, based on the command information and the input device operation information, the summary of the content of the change made to the file asset, and extracts, as the summary information, the changed item and the summary of the content of the change, and the processing circuitry improves efficiency of managing changes in control programs for factory automation by: acquiring learning data containing the operation history information and a piece of the summary information selected by the user or the summary information modified by the user: generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

11. An asset management system, comprising:

a storage;

a database; and processing circuitry to acquire, from an operation log file generated in an engineering tool, operation history information indicating a history of operations on a file asset in the engineering tool, the operation log file including content of operations performed on the file asset in the engineering tool and the history of operations includes adding a program and modifying the contents of an existing program for controlling industrial equipment in a factory automation system, extract, from the operation history information, summary information indicating a summary of content of a change made to the file asset, display the summary information in the form of a summary information table on a user interface of an output device, the summary information table including a first column having checkboxes for storage target items, a second column of changed items, and a third column of a summary of contents of the changes made to the file asset; and in response to a user selecting one of the checkboxes for the storage target items, cause the summary information for the selected checkbox to be stored into a database, and acquire, from comparison information, detailed information indicating details of the content of the change, the comparison information being generated by a comparison between a file asset before the change made in the engineering tool and a file asset after the change using the summary information, display the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, wherein the detailed information window is separate from the summary information table, the file asset is a file defining an application to be executed in the engineering tool, the items include program, unit configuration and label, in response to a user selecting one of the buttons, display an image indicating content of the differenced in a corresponding one of the changed items, the database stores the summary information and the detailed information, and the processing circuitry causes the detailed information to be stored into the database, acquires, as the operation history information, from the operation log file, application information indicating the application executed in the engineering tool, operated window information indicating a window operated in the application, command information indicating a command executed in the operated window, input device operation information indicating an operation performed in the operated window with an input device, and operation time information indicating a time of occurrence of a change in the application information, the operated window information, the command information, or the input device operation information, identifies, based on the operated window information, a changed item subject to the change made to the file asset, generates, based on the command information and the input device operation information, the summary of the content of the change made to the file asset, and extracts, as the summary information, the changed item and the summary of the content of the change, and the processing circuitry improves efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

12. An asset management method, comprising:

acquiring operation history information from an operation log file generated in an engineering tool, the operation history information indicating a history of operations on a file asset in the engineering tool, the file asset being a file defining an application to be executed in the engineering tool for controlling industrial equipment in a factory automation system;

acquiring, as the operation history information, from the operation log file, application information indicating the application executed in the engineering tool, operated window information indicating a window operated in the application, command information indicating a command executed in the operated window, input device operation information indicating an operation performed in the operated window with an input device, and operation time information indicating a time of occurrence of a change in the application information, the operated window information, the command information, or the input device operation information;

extracting, from the operation history information, summary information indicating a summary of content of a change made to the file asset;

displaying the summary information in the form of a summary information table on the user interface of the output device, the summary information table including a first column having checkboxes for storage target items, a second column of changed items, and a third column of a summary of contents of the changes made to the file asset;

in response to a user selecting one of the checkboxes for the storage target items, causing for the selected checkbox to be stored into a database;

acquiring, from comparison information, detailed information indicating details of the content of the change, the comparison information being generated by a comparison between the file asset before the change made in the engineering tool and the file asset after the change using the summary information;

displaying the detailed information in a detailed information window on the user interface of the output device, the detailed information window including a first column indicating items subject to changes made to the file asset, a second column indicating details of content of the changes made to the file asset, and a plurality of buttons, each button being adjacent to a corresponding row, the items including program, unit configuration and label;

in response to a user selecting one of the buttons, displaying an image indicating content of the difference in a corresponding one of the changed items;

causing the detailed information to be stored into the database;

identifying, based on the operated window information, a changed item subject to the change made to the file asset;

generating, based on the command information and the input device operation information, the summary of the content of the change made to the file asset;

extracting, as the summary information, the changed item and the summary of the content of the change; and causing the summary information to be stored into the database, wherein the detailed information window is separate from the summary information table, and the method further comprises improving efficiency of managing changes in control programs for factory automation by: acquiring learning data containing the operation history information and a piece of the summary information selected by the user or the summary information modified by the user; generating a learned model using the learning data, the learned model being designed to infer the summary information from the operation history information based on user feedback; acquiring the operation history information; inferring, using the learned model, the summary information from the acquired operation history information; and causing the inferred summary information to be stored into the database.

* * * * *